(No Model.) 3 Sheets—Sheet 1.
M. P. MIGHELL.
AUTOMATIC GRAIN WEIGHER.

No. 537,540. Patented Apr. 16, 1895.

Witnesses
Geo. E. Frech.
W. S. Boyd.

Inventor
M. P. Mighell
By John G. Manahan
Attorney (No Model.) 3 Sheets—Sheet 2.

M. P. MIGHELL.
AUTOMATIC GRAIN WEIGHER.

No. 537,540. Patented Apr. 16, 1895.

Witnesses: Inventor.

(No Model.)  3 Sheets—Sheet 3.
M. P. MIGHELL.
AUTOMATIC GRAIN WEIGHER.

No. 537,540.  Patented Apr. 16, 1895.

WITNESSES:  INVENTOR:

UNITED STATES PATENT OFFICE.

MONTRAVILLE P. MIGHELL, OF STERLING, ILLINOIS.

AUTOMATIC GRAIN-WEIGHER.

SPECIFICATION forming part of Letters Patent No. 537,540, dated April 16, 1895.

Application filed April 19, 1894. Serial No. 508,114. (No model.)

*To all whom it may concern:*

Be it known that I, MONTRAVILLE P. MIGHELL, a citizen of the United States, residing at Sterling, in the county of Whiteside and State of Illinois, have invented certain new and useful Improvements in Automatic Grain-Weighers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention pertains to automatic grain weighers, adapted to be placed in any position in which the grain can be passed through the same, and is specially advantageous in weighing grain from an elevator into the cars.

The advantage of my invention consists in the facts that the scale beam is seated directly over the machine, that the weighing hopper is supported at the sides thereof by a series of flexible bearings, whereby said hopper has a true vertical movement regardless of the amount of the grain in the same, or as to what part of the hopper the bulk of the weight of the grain may be placed, and that only the lower portion of the hopper partition is shifted at each discharge of grain.

I attain the purposes of this invention by the construction illustrated in the accompanying drawings, in which—

Figure 1:
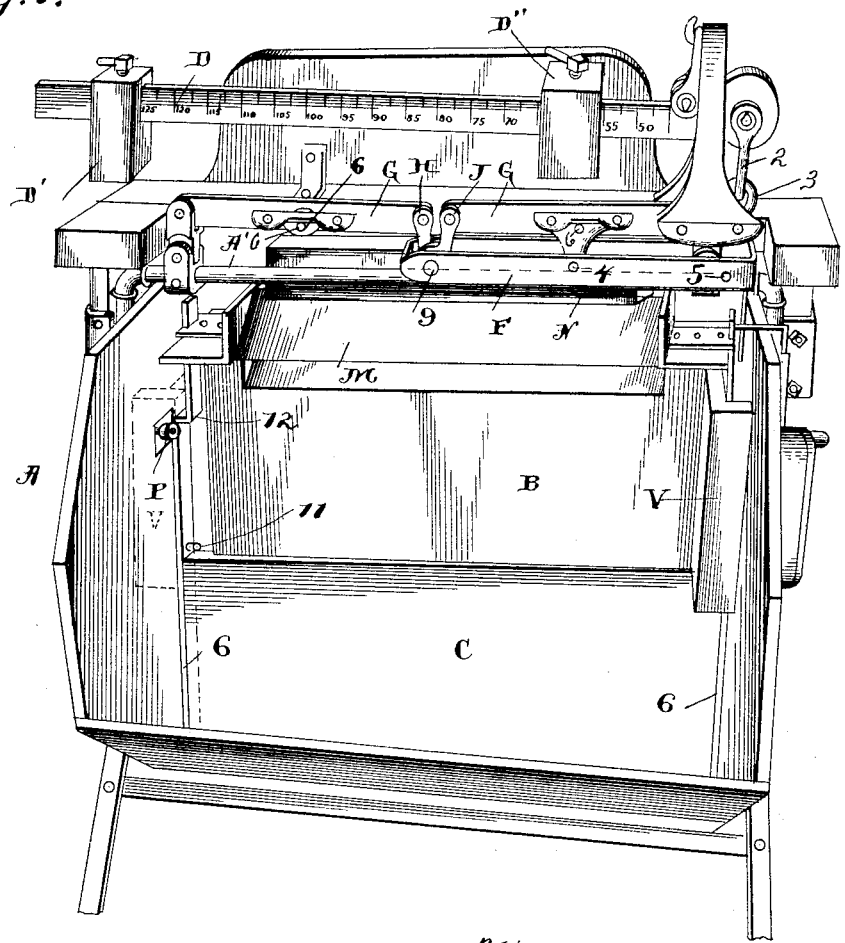
Figure 6:
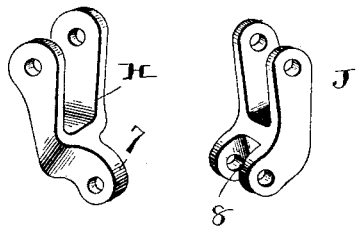
Figure 7:
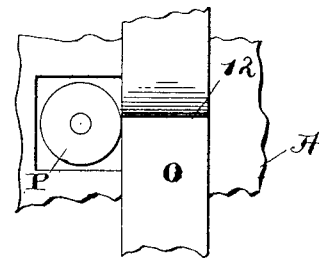
Figure 2:
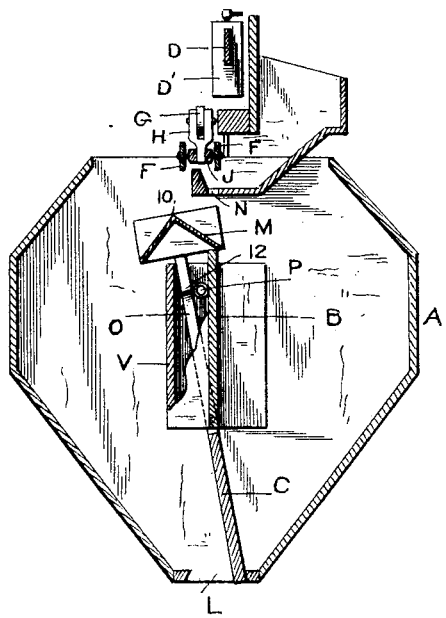
Figure 5:
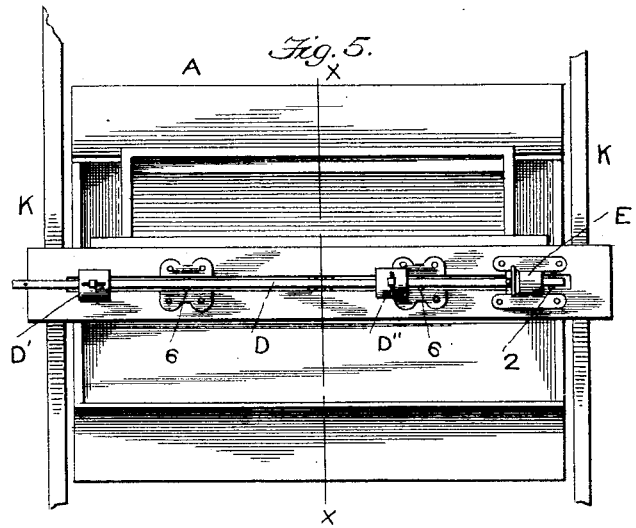
Figure 3:
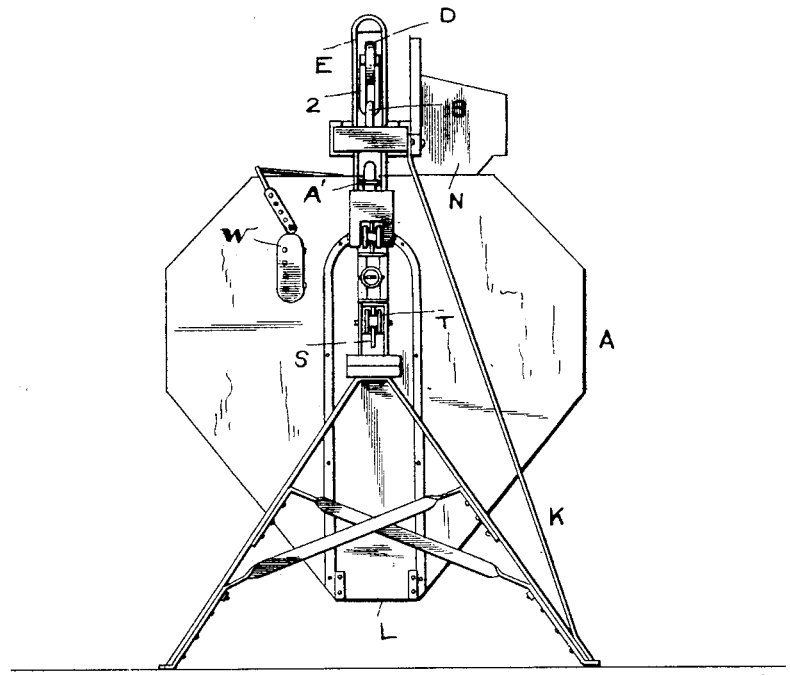
Figure 4:
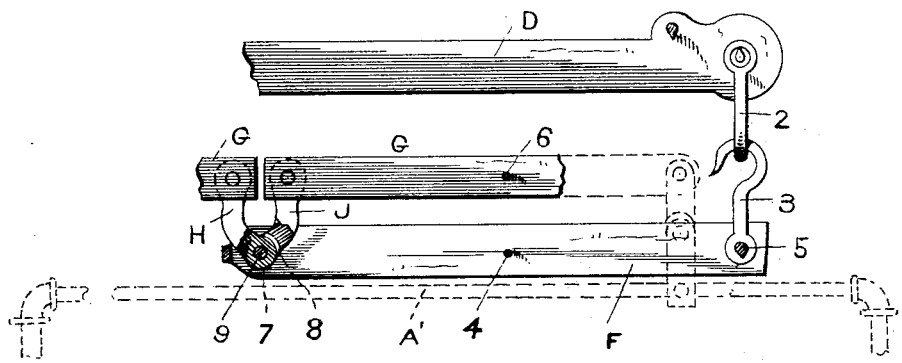

Figure 1 is a perspective view. Fig. 2 is a vertical sectional view in line $x-x$ of Fig. 5. Fig. 3 is end elevation. Fig. 4 is a detail of the scale mechanism; Fig. 5, a top plan view. Fig. 6 is a perspective view of toggles H and J. Fig. 7 is a detail view of rod O, and roller P.

Similar letters and figures refer to similar parts throughout the several views.

A is the main hopper, divided into two compartments by the upper partition board B suitably fixed within said hopper, and the movable lower partition board C.

D is the graduated scale beam, provided with a pea D' for balancing scales, and pea D'', which are set by means of suitable set-screws inserted in their upper surfaces to permit the hopper to descend and discharge its contents at any predetermined weight. The scale D is pivotally supported at 1 upon the fixed vertical bracket E suitably seated on the frame of the machine near one side of the latter.

A link 2 is pivotally attached at its upper end to the short end of scale beam D, and in the lower end of said link the upper end of a hook 3 is inserted, the lower end of said hook being pivoted between two parallel transverse levers F extending slightly over one-half the width of the machine. The levers F are joined at their inner ends, and fulcrumed to the frame of the machine about centrally at 4, and the lower end of the supporting hook 3 extends between the levers F and is pivotally connected therewith, near one end of said levers, by the cross pin 5 extending through both of said levers and the opening in the lower end of hook 3. The inner or opposite ends of levers F are pivotally connected with the inner ends of two cross levers G—G. The outer ends of the levers G—G are pivotally connected to the bail A' of the hopper A, and extend, respectively, from each side of the machine inward, and are fulcrumed about centrally, respectively, on the frame of the machine at 6—6.

A toggle H is pivotally seated on the inner end of one of the levers G, and extended downward and provided with a flat lower end 7, adapted to be pivotally seated within the slot 8 formed in the corresponding toggle J, pivotally suspended from the inner end of the other beam G. The lower ends of the toggles H and J, thus interlocked, are inserted downward between the twin levers F, and pivotally attached to the latter at 9, near the inner ends of the levers F. All of the above pivotal bearings are what is known as "knife-edged."

By means of the above described mechanism the hopper A is supported upon the frame K of the machine, and adapted whenever any predetermined quantity of grain is received into the hopper A to descend to a limited degree.

An opening L, of sufficient width, extends across the lower extremity of the hopper A, and the grain, after being weighed, is discharged through said opening, alternately from the two compartments within said hopper. The grain is directed into, and discharged from said compartments alternately, by the following mechanism:

M is a double incline, extending a sufficient distance transversely of the upper portion of the interior of the hopper, having an apex 10 from which the two sides of the incline M decline, respectively, to the opposite sides of the hopper board B of the partition.

N is the grain chute, which delivers the incoming grain alternately upon the two sides of the incline M. Each downward movement of the hopper A throws the apex 10 of the incline M to the then opposite side of the discharge edge of the chute N, and at the same time throws the movable lower board C of the partition in the opposite direction. This is accomplished in the following manner: Two vertical bars O are pivoted to pins 11 attached to the respective inner sides of the hopper A, and extended substantially the full height of said hopper. To the lower portion of said bars O, that is to say below the fixed board B, is suitably attached to said bars the movable board C of said partition, which extends downwardly slightly within the opening L, and the double incline M is suitably supported between and by the upper ends of the bars O.

The weight of the grain, received in one of the compartments of the hopper A, presses against the movable board C, which pressure gradually increases as the grain is received in said compartment, and said bars O are held against oscillation on the pivot 11 by the short studs P, provided with friction rollers, and projected from the frame of the machine slightly within the respective sides of the hopper, in position to lie against the side of said bars O. When the machine is in operation said studs are always on the same side of the bars O where the grain is being received. In each of the bars O is formed a recess 12, about one-eighth of an inch above the lower portion of the stud P when the hopper is at its upper limit.

When the desired quantity of grain has been received within one of the comparments C, and the hopper slightly descends, the recesses 12 in bars O pass just below the studs P, and the pressure of the grain on board C forces the latter toward the other compartment, and the bars O, turning on their pivot 11, throw the recesses 12 past the studs P, and thereby discharge the grain through the opening L. As soon as the weight in said discharging compartment is slightly decreased, the hopper A rises and the bars O pass up against the studs P at the opposite side of the latter, thereby holding the board C firmly against the incoming grain on the other side. The movement just described shifts the apex 10 of the incline M, carried on the upper ends of the bars O, past the discharge chute N, so that the incoming grain passes into the opposite compartment. The board B is of such thickness that the movements of board C thereunder create no space between said boards.

The hopper A is held, in its vertical shiftings, against oscillation by two short vertical rods S, attached to each outside of said hopper, which play in twin grooved friction rollers T, seated in the frame K.

Any ordinary form of mechanism, as shown at W, Fig. 3, may be employed for registering the number of times the hopper has been operated.

The further advantages of my invention are,—that all of the supports are in line and parallel with the beam D. The upper portion of the bars O are inclosed in fixed boxes V, attached to the inner sides of the hopper A, whereby the said bars are kept from coming in contact with the grain, and have, therefore, no resistance in their oscillation.

The purpose in making the upper portion of the hopper partition of the fixed board B, and to have merely the power portion C oscillate, is to render it practicable to fill each compartment entirely, if desired. If the entire partition, consisting of boards B and C, oscillated on the pivot 11, it is obvious that the upper portion of said partition in the discharge of the grain would move toward the grain, and would, therefore, retard the movement of the lower or discharge portion of said partition, and to avoid this it would be necessary to have the hopper so large that it would contain, in its lower portion, all of the grain desired to be weighed; but in my construction, as the upper half of said partition is fixed, I can fill each compartment entirely, without any detriment to the swinging quality of the lower portion. In fact, the fuller the compartment is the more pressure there will be on the lower half of said partition, and therefore the more readily will the latter act. I can, therefore, use a smaller hopper than would be otherwise practicable.

Again, in automatic weighers of this description, the grain which may be falling from the chute N, during the period of shifting, is not weighed, and therefore the weighing to that extent would be inaccurate. By the use of the hopper well filled before shifting there is necessarily a minimum of falling grain to create this discrepancy, and in my construction I can permit each compartment to fill entirely up to the edge of the chute N before shifting, and therefore have all of the grain weighed which is received in either compartment before it is discharged, and the bars O, resting against the friction rollers seated upon studs P at or below the centers of said rollers, said shifting is instantaneous, and as there is no space for falling grain during the process of shifting, substantially all of the grain received in each filled compartment is accurately weighed.

My invention is adapted to be used with any of the well known registers, and as the construction and operation of the latter are well known, and I do not claim anything in that respect, I do not deem it necessary to show or describe the same; but

What I claim as my invention, and desire to secure by Letters Patent of the United States, is—

1. The combination of a frame K, scale beam D suitably supported thereon, twin levers F centrally fulcrumed on said frame, and flexibly connected at one end to the short end of beam D, transverse levers G—G centrally fulcrumed on said frame, and at their inner ends pivotally connected with the inner end of levers F, and hopper A pivotally supported at each side from the outer ends of levers G; substantially as shown, and for the purpose described.

2. The combination of frame K, of a hopper provided with a bail beam D suitably supported thereon, twin levers F centrally fulcrumed on said frame, and flexibly connected at their outer ends to the short end of beam D, levers G pivotally connected at their outer ends to the bail of said hopper A and provided, respectively, at their inner ends with toggles H and J, and connected thereby to the inner end of levers F; substantially as shown, and for the purpose described.

3. The combination, with the frame K, of a hopper A movably secured thereto, the end walls of said hopper being each provided with an opening, a fixed box upon each of said walls, a pin upon the frame projecting through each opening into the box, a pivot on each end wall, a bar upon each pivot provided with a recess adjacent the pin, a board secured to the end of the bars below the pivotal point, a double incline secured to the upper ends of the bars, and a chute for delivering material to the machine, substantially as set forth.

4. The combination of the frame K provided with inwardly projecting studs P, hopper A pivotally supported in said frame, and provided with pivots 11, beam D suitably fulcrumed on said frame, twin levers F also centrally fulcrumed on said frame, and flexibly connected at their outer ends with the short end of beam D, levers G pivotally connected at their outer ends with hopper A, and centrally fulcrumed on said frame, and pivotally connected at their inner ends with the inner ends of levers F, vertical bars O provided with recesses 12, and pivotally seated on pivot 11, chute N, fixed board B seated transversely in said hopper; board C rigidly connected to the lower portion of bars O, and double incline M carried upon the upper end of said bars; substantially as shown, and for the purpose described.

In testimony whereof I affix my signature in presence of two witnesses.

MONTRAVILLE P. MIGHELL.

Witnesses:
JOHN G. MANAHAN,
ABRAM L. KREIDER.